US009474082B2

United States Patent
Bevan et al.

(10) Patent No.: US 9,474,082 B2
(45) Date of Patent: Oct. 18, 2016

(54) METHOD AND APPARATUS FOR CO-SCHEDULING TRANSMISSIONS IN A WIRELESS NETWORK

(75) Inventors: David Bevan, Bishops Stortford (GB);
Simon Gale, Bishops Stortford (GB);
Julius Robson, Isle of Wight (GB);
Peter Deane, Fitzroy Harbour (CA)

(73) Assignee: Apple Inc., Cupertino, CA (US)

( * ) Notice: Subject to any disclaimer, the term of this patent is extended or adjusted under 35 U.S.C. 154(b) by 837 days.

(21) Appl. No.: 12/614,522

(22) Filed: Nov. 9, 2009

(65) Prior Publication Data

US 2011/0111760 A1 May 12, 2011

(51) Int. Cl.
| | |
|---|---|
| *H04W 72/00* | (2009.01) |
| *H04W 72/12* | (2009.01) |
| *H04B 7/04* | (2006.01) |
| *H04W 72/04* | (2009.01) |

(52) U.S. Cl.
CPC ......... *H04W 72/121* (2013.01); *H04B 7/0452* (2013.01); *H04W 72/046* (2013.01)

(58) Field of Classification Search
CPC ........... H04W 72/121; H04W 7/0452; H04W 72/046
See application file for complete search history.

(56) References Cited

U.S. PATENT DOCUMENTS

| | | | |
|---|---|---|---|
| 2003/0128658 A1 | 7/2003 | Walton et al. | |
| 2004/0136343 A1* | 7/2004 | Lee et al. | 370/335 |
| 2005/0111599 A1 | 5/2005 | Walton et al. | |
| 2006/0094367 A1* | 5/2006 | Miyoshi et al. | 455/67.11 |
| 2007/0171808 A1* | 7/2007 | Wu et al. | 370/208 |
| 2008/0242225 A1* | 10/2008 | Krishnamoorthi et al. | 455/9 |
| 2008/0267098 A1* | 10/2008 | Walton et al. | 370/280 |
| 2010/0035645 A1* | 2/2010 | Chang et al. | 455/522 |

FOREIGN PATENT DOCUMENTS

| | | |
|---|---|---|
| KR | 10-2005-0071620 | 7/2005 |
| WO | WO 2007/109679 | * 3/2007 |

OTHER PUBLICATIONS

Search Report, European Application No. 15161840.2, mailed Aug. 13, 2015, 8 pages.
Zhang et al., "An Efficient Resource-Allocation Scheme for Spatial Multiuser Access in MIMO/OFDM Systems", IEEE Transactions on Communications, Jan. 1, 2005, 10 pages, vol. 53, No. 1, IEEE Service Center, Piscataway, NJ, USA.
Zte, "Performance Comparison of Unitary vs. Non-Unitary Precoding for MU-MIMO", 3GPP Discussion, Oct. 9-13, 2006, 6 pages, Seoul, Korea.

* cited by examiner

*Primary Examiner* — Keith Fang
(74) *Attorney, Agent, or Firm* — Meyertons, Hood, Kivlin, Kowert & Goetzel, P.C.

(57) ABSTRACT

The invention relates to a method and apparatus for determining whether two user equipments (UEs) in a wireless network can be co-scheduled by an uplink scheduler. The method includes the determination of orthogonality factors for each pair of equipments to be considered and, from the orthogonality factors, selecting UEs to be co-scheduled.

13 Claims, 5 Drawing Sheets

METHOD AND APPARATUS FOR CO-SCHEDULING TRANSMISSIONS IN A WIRELESS NETWORK

FIELD OF THE INVENTION

This invention relates to an apparatus for and a method of co-scheduling user equipment transmissions. The invention is applicable to use within wireless networks and, more particularly, to use within base stations of wireless networks.

BACKGROUND OF THE INVENTION

In wireless networks care is given to the scheduling of transmissions both in the time and frequency domain from user equipments (UEs) to base stations. If the UEs are located close together spatially and there is a significant overlap in the time and frequency at which uplink transmissions from the UEs are sent to a base station, there will be interference between the UEs' transmissions. This interference may mean that the quantity of information per transmission burst from each UE which can be successfully decoded is small (i.e. they may need to choose a low-order modulation alphabet).

Conventionally, to overcome this deficiency, networks assign each UE transmitting to a base station a different time-frequency resource block in which to transmit. Since the UEs within a cell now do not interfere with one another, they can each transmit more information per transmission burst (e.g. by choosing a higher-order modulation alphabet)

However, the assignment of separate (non-shared) time-frequency resource blocks limits the resource allocated to a UE's transmission burst, since the overall resource on the wireless medium is generally shared equitably between the users.

One technique that is used to make more efficient use of the available resource involves co-scheduling pairs of UEs on the same time-frequency resource block. In this technique UEs are only co-scheduled when the signals from the UEs are deemed to be sufficiently segregated spatially. However, when co-scheduling is implemented in this manner residual interference may still occur at the receiver, for example due to any remaining overlap between the UE signals, reducing the quantity of information per transmission burst from each UE which can be successfully decoded. The invention described herein relates to techniques for optimally selecting UEs for co-transmission such that any remaining residual interference is minimised.

SUMMARY OF THE INVENTION

According to an aspect of the invention there is provided a method of selecting user equipments for co-scheduling in a wireless network, the wireless network including a receiver including a plurality of antennas and a plurality of user equipments, each user equipment including one antenna, the method comprising determining a feature for each transmission from a user equipment to the receiver, comparing the transmission feature of each user equipment with the transmission feature of another user equipment to determine the orthogonality of the features, and selecting a pair of user equipments with the greatest orthogonality for simultaneous transmission. By determining the orthogonality of the features the user equipments which are least likely to interfere can be identified and co-scheduled.

Optionally, the feature may be the steering vector for the transmission of the user equipment which enables the UEs with the greatest separation spatially to be identified. The orthogonality may be calculated using a conjugate transpose of the feature.

The UEs for co-scheduling are preferably transmitting across a channel where the change of phase and amplitude of tone during a transmission is substantially consistent. This means that there is minimum change in the features of the transmission during the transmission and therefore the interactions between the UE transmissions are relatively constant.

Preferably, each further pair of user equipments is co-scheduled in decreasing levels of orthogonality. This means that the pairs of user equipments are co-scheduled in the reverse of the order in which they are most likely to interfere.

Additionally, it is preferable that each pair of user equipment is only co-scheduled if the orthogonality factor is below a threshold as this means only transmissions with sufficiently low interference between them are co-scheduled. The orthogonality factor is preferably a factor measured between 0 and 1 and an orthogonality factor equal to zero means that the transmissions are completely orthogonal and an orthogonality factor equal to one means that the transmissions are co-linear.

Optionally, a modified orthogonality factor may be calculated by multiplying the orthogonality factor by a modifying factor. The modifying factor may be, for example, the greater SINR of the SINR for each user equipment in the pair of user equipments, $\log_{10}(\text{SINR}_{MAX})$, or the greatest function of the SINR for each user equipment in the pair of user equipments. This prevents a noisy signal being co-scheduled and reduces the likelihood of interference between the transmissions of the two user equipments. A further factor could also be introduced to favour scheduling of user equipments with near equal SINR. An example of this further factor would be the ratio of $\text{SINR}_{MAX}$ to $\text{SINR}_{MIN}$.

The method may include the further steps of determining the throughput for the user equipments and, if the combined throughput is less than a threshold, separately scheduling the user equipments. An example of the threshold would be a threshold equal to the throughput when the two user equipment transmissions are scheduled individually.

The throughput for each user equipment individually and the throughput for each pair of user equipments combined may be calculated, and the user equipment or pair of user equipments having the highest throughput being scheduled first. This enables the channel capacity to be used to its fullest extent.

According to another aspect of the invention there is provided an uplink scheduler to co-schedule user equipments in a wireless network including an input to receive a transmission feature of a user equipment, a comparator to compare the transmission feature from each user equipment to determine an orthogonality of the features and a processor to select a pair of user equipments with the greatest orthogonality for simultaneous transmission.

Optionally, the feature may be the steering vector for a transmission from the user equipment as received at the base station.

The uplink scheduler may further include a channel selector to select a channel where the change of phase and amplitude of tone during a transmission is substantially consistent across both the time and frequency dimensions. The user equipments forming a group from which user equipments are co-scheduled are selected from user equipments which may transmit across the channel.

The modified orthogonality factor may be the feature x greater SINR of the SINR for each user equipment in the pair of user equipments.

Preferably, the processor calculates the throughput for each user equipment individually and the throughput for each pair of user equipments combined, and selects the approach that will maximise throughput. For example, this may be achieved by co-scheduling the user equipment or pair of user equipments having the highest throughput first. Further pairs of user equipment or individual user equipment are co-scheduled in decreasing levels of throughput According to a further aspect of the invention there is provided a base station including an uplink scheduler to co-schedule user equipments in a wireless network including a receiver to receive a transmission from a user equipment, and an uplink scheduler including a comparator to compare a transmission feature of the transmission from each user equipment to determine an orthogonality of the features and a processor to select a pair of user equipments with the greatest orthogonality for simultaneous transmission.

According to yet another aspect of the invention there is provided a computer program product including a computer useable medium having computer program logic stored therein to enable an uplink scheduler to: receive a feature for each transmission from a user equipment to a receiver, compare the transmission feature of each user equipment with the transmission feature of another user equipment to determine the orthogonality of the features and select a pair of user equipments with the greatest orthogonality for simultaneous transmission between the user equipments and the receiver.

BRIEF DESCRIPTION OF THE DRAWINGS

Other aspects and features of the present invention will become apparent to those ordinarily skilled in the art upon review of the following description of specific embodiments of the invention in conjunction with the accompanying figures.

DETAILED DESCRIPTION OF PREFERRED EMBODIMENTS

Figure 1:
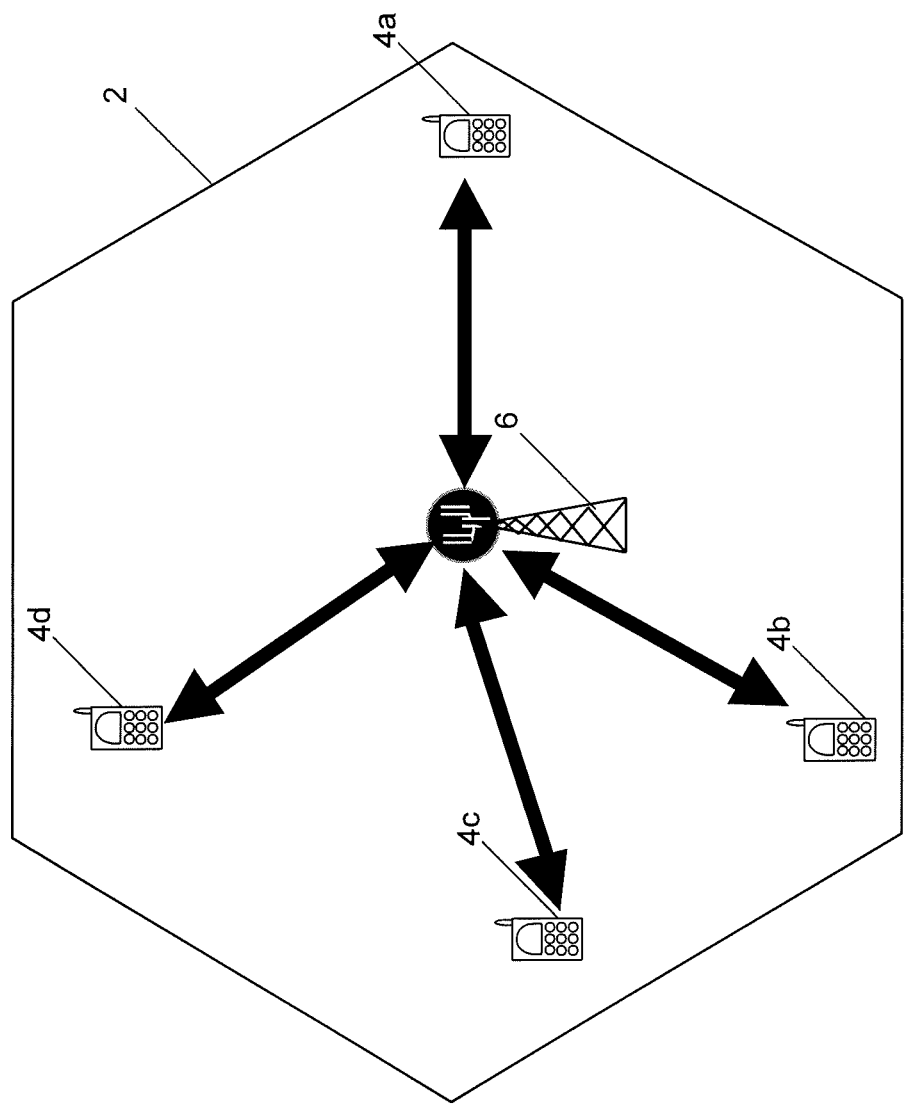
FIG. 1 illustrates a cell within a wireless network in which the present invention may be implemented.
Figure 2:
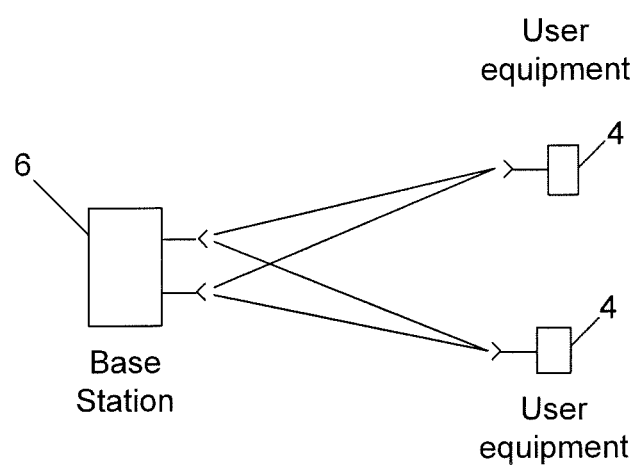
FIG. 2 illustrates a receiver and user equipments in which the invention may be implemented.

FIG. 1 illustrates a cell 2 within a network in which the present invention may be implemented. The invention is preferably an OFDM network including multiple UEs 4 and a receiver station 6. The UEs 4 have single antennas and a receiver station 6, such as a base station, has two receiver antennas as illustrated in FIG. 2.

The base station 6 includes an uplink scheduler for scheduling uplink transmissions from the UEs 4 to the base station 6. The uplink scheduler determines which time-frequency resource block a UE 4 can use to transmit data. In the present invention, the uplink scheduler is further arranged to determine whether two, or more, UEs 4 can transmit simultaneously in a single time slot of an uplink channel without causing significant degradation in the signals from the UEs 4.

Figure 3:
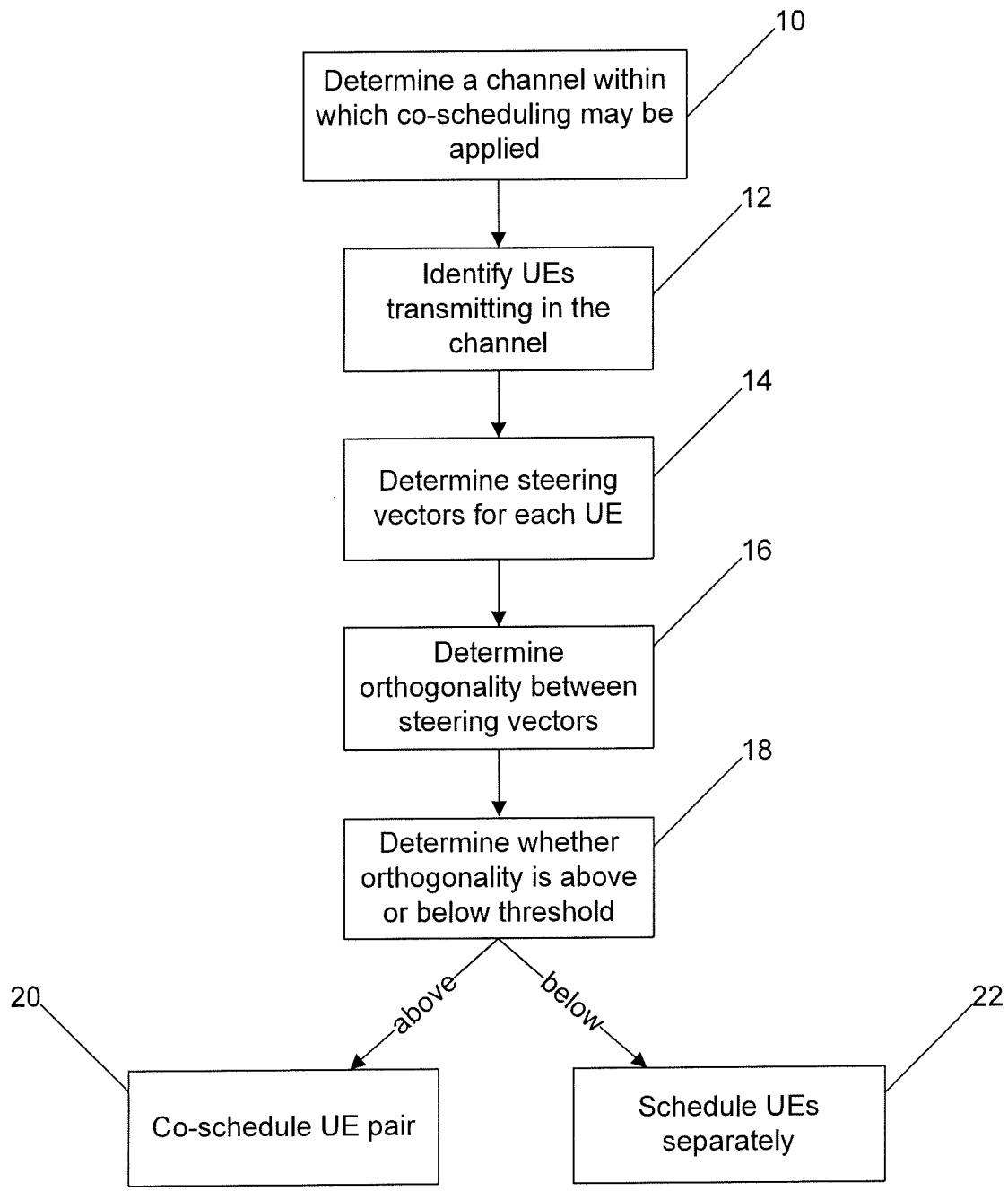
FIG. 3 is a flow diagram of a method of co-scheduling UEs in a wireless network.

Firstly, as illustrated in step 10 of FIG. 3, the uplink scheduler selects a channel in which co-scheduling may be applied. The channel selected may be any group of tones across which the change of phase and amplitude of a tone is substantially consistent in both the time and frequency dimensions during a transmission. Once the channel has been determined the UEs that may transmit within the channel can be identified, as illustrated in step 12.

Once the UEs have been identified the pilot tones for each of the UEs in the group are analysed to estimate the steering vectors for each of the UEs as illustrated in step 14. The pilot tones may be from recent uplink transmissions from those UE, or from specially-scheduled uplink 'sounding bursts'. Any suitable channel estimation method may be used to estimate the steering vectors for each of the UEs.

For each UE transmitting from a single antenna to a base station with two antennas the UE transmission will have a steering vector. The steering vector, including a single (complex) element for each antenna, being represented as:

$$H_1 = \begin{pmatrix} a+jb \\ c+jd \end{pmatrix}.$$

Thus, for the simple implementation in a channel with two user equipments, UE1 and UE2 the antenna vectors H1 and H2 for each of the UE1 and UE2 respectively are:

$$H_1 = \begin{pmatrix} a+jb \\ c+jb \end{pmatrix} \quad H_2 = \begin{pmatrix} e+jf \\ g+jk \end{pmatrix}$$

Once the steering vectors for each UE have been determined, in step 14, an orthogonality factor between the steering vectors of UE1 and UE2 is calculated, in step 16, using the conjugate transpose:

$$OF = \frac{|H_1^H H_2|}{|H_1||H_2|}$$

where $H_1^H = (a-jb, c-jd)$ $$|H_1| = \sqrt{a^2+b^2+c^2+d^2}$$

$$|H_2| = \sqrt{e^2+f^2+g^2+k^2}$$

Once the orthogonality factor has been determined the uplink scheduler can determine whether the orthogonality factor is below a pre-determined threshold, as illustrated in step 18. If the orthogonality factor is below the threshold then the transmissions by the two UEs can be co-scheduled as illustrated in step 20. If, however, the orthogonality factor is above the threshold then the transmissions by the two UEs will interfere with each other too greatly and the UEs are instead scheduled individually as illustrated in step 22.

It will be understood by one skilled in the art that any other suitable equation may be used to determine an orthogonality factor, and the orthogonality factor is a representation of the orthogonality of the transmissions of two UEs.

Where there are more than two UEs within the channel that is selected in step 10 then a similar comparison can be done between each pair of the UEs within a group of UEs within the channel. The comparison determines which pair of UEs have the lowest orthogonality factor and therefore which pair of UEs within the group are most suited to co-scheduling. For example, when there are five UEs transmitting within the determined channel to the base station with the following steering vectors:

$$H(1)\begin{pmatrix} 0.059 + 0.143i \\ 0.669 - 1.914i \end{pmatrix} \quad \text{UE1}$$

$$H(2)\begin{pmatrix} 0.229 + 1.188i \\ 0.569 - 0.172i \end{pmatrix} \quad \text{UE2}$$

$$H(3)\begin{pmatrix} -0.546 - 0.642i \\ -0.236 - 0.964i \end{pmatrix} \quad \text{UE3}$$

$$H(4)\begin{pmatrix} -0.095 + 0.556i \\ -1.271 + 0.563i \end{pmatrix} \quad \text{UE4}$$

$$H(4)\begin{pmatrix} -1.034 - 0.089i \\ 0.477 - 0.430i \end{pmatrix} \quad \text{UE5}$$

The orthogonality factors between each pair of UEs is then calculated using the conjugate transpose as described previously giving an orthogonality factor matrix:

$$\begin{array}{c c c c c c} & 1 & 2 & 3 & 4 & 5 \\ 1 & \begin{pmatrix} 1 & 0.485 & 0.713 & 0.911 & 0.53 \\ 0.485 & 1 & 0.51 & 0.127 & 0.627 \\ 0.713 & 0.51 & 1 & 0.795 & 0.582 \\ 0.911 & 0.127 & 0.795 & 1 & 0.783 \\ 0.53 & 0.627 & 0.582 & 0.783 & 1 \end{pmatrix} \\ 2 \\ 3 \\ 4 \\ 5 \end{array}$$

As can be seen the orthogonality factor between UEs 2 and 4 is the lowest at 0.127. Thus, the uplink scheduler co-schedules the transmissions of UEs 2 and 4. UEs 2 and 4 are then removed from the group of UEs being considered by the uplink scheduler for co-scheduling.

The lowest orthogonality factor between the remaining UEs, UEs 1, 3 and 5, is between UE 1 and UE 5. The uplink scheduler therefore co-schedules the transmissions of UE 1 and UE 5. UEs 1 and 5 are also removed from further consideration for co-scheduling. UE 3 is not co-scheduled with any other UE and is therefore assigned its own timeslot.

Optionally, the uplink scheduler may apply a threshold to the orthogonality factor and prevent a pair of UEs having an orthogonality factor above a threshold from being co-scheduled. For instance, in the example given with reference to five UEs above, the threshold may be set at 0.5. If the threshold is set at this level then the uplink scheduler will not co-schedule UE 1 and UE 5 as their orthogonality factor (0.53) is above the threshold. In this instance, the uplink scheduler co-schedules UEs 2 and 4, as their orthogonality factor is below the threshold, and UEs 1, 3 and 5 are scheduled separately.

Figure 4:
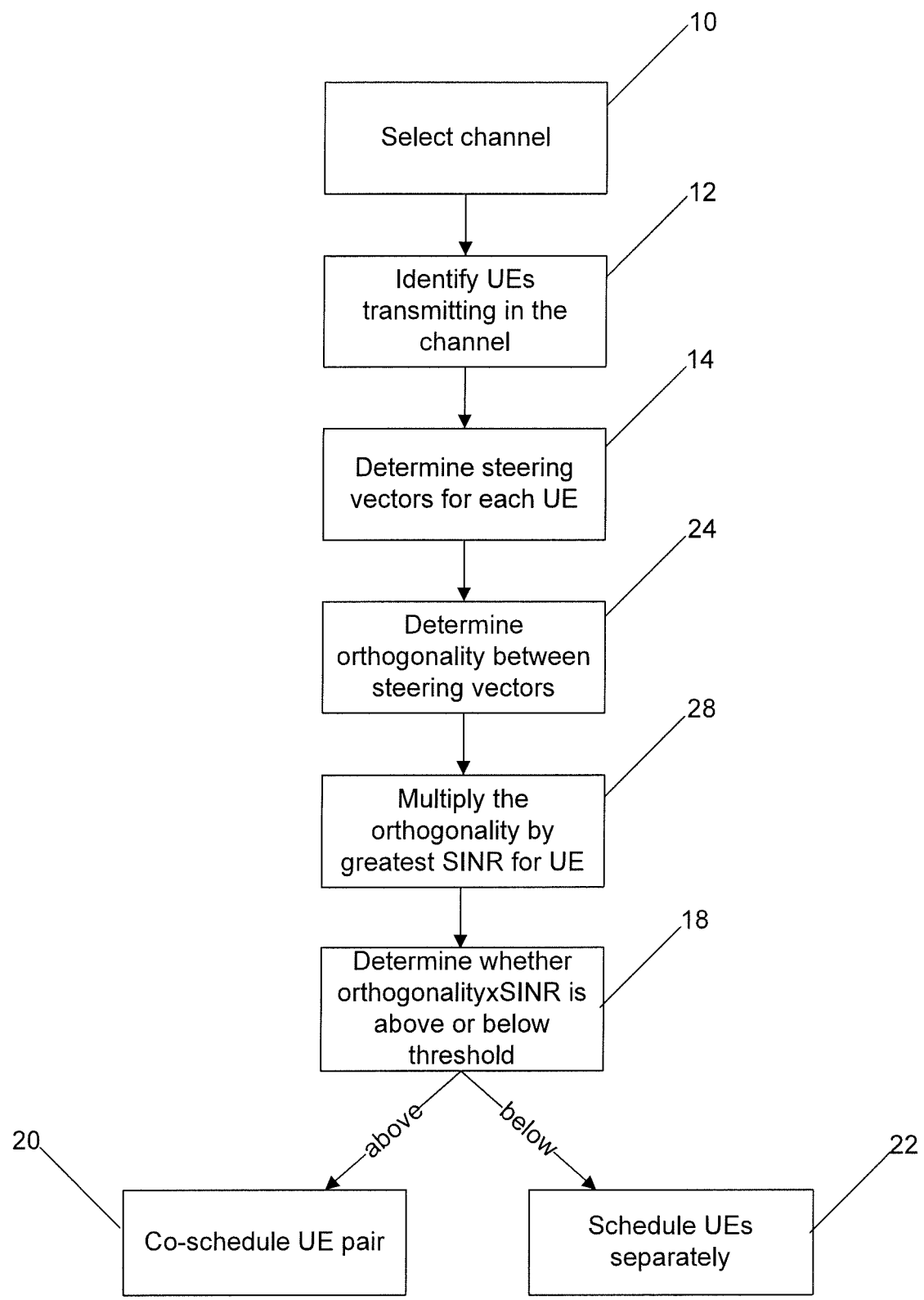
FIGS. 4 and 5 are flow diagrams of alternative methods of co-scheduling UEs in a wireless network.

Optionally, the orthogonality factor may be modified to take into account other factors. For example, the SINR (Signal to Interference-plus-Noise Ratio) may be taken into account. This is because if there is a signal with a high SINR it would be advantageous to use a high order modulation, which could be vulnerable to interference from a co-scheduled user. One method for taking into account the SINR is now described with reference to FIG. 4.

The method is identical to that described previously with reference to FIG. 3 except that, after calculating the orthogonality factor for a pair of UEs in step 16, the orthogonality factor is multiplied by the greater SINR of each of the two UEs used to calculate the orthogonality as illustrated in step 24. The Orthogonality Factor x greatest SINR for each pair of UEs in the group of UEs transmitting in the channel are compared. The pair of UEs with the lowest OF x SINR are co-scheduled as illustrated in step 28. Further pairs of UEs are co-scheduled by comparing this OF x SINR of the remaining pairs of UEs, until all the pairs of UEs are co-scheduled.

Other than multiplying the orthogonality factor by the SINR the orthogonality factor may be multiplied by a function of the highest SINR belonging to one of the UEs. One example of such a function is $\mathrm{Log}_{10}(\mathrm{SINR}_{MAX})$, although one skilled in the art would understand that any suitable function may be used.

Optionally, a threshold may be set so that if the orthogonality factor multiplied by the maximum SINR is above a threshold the UE with the maxiumum SINR is not co-scheduled with another UE. Alternatively, the SINR for each UE may be determined and the SINR for each UE then compared to a threshold SINR. For any UE where the SINR is greater than the threshold SINR the uplink scheduler determines that the UE is not to be co-scheduled with any other UEs and to schedule the UE singly. For the UEs where the SINR is below a threshold the orthogonality factors are determined and transmissions co-scheduled as described with reference to FIG. 2.

Alternate factors may be taken into account instead of or in addition to the SINR. For example, the throughput of the pair of UEs.

Figure 5:
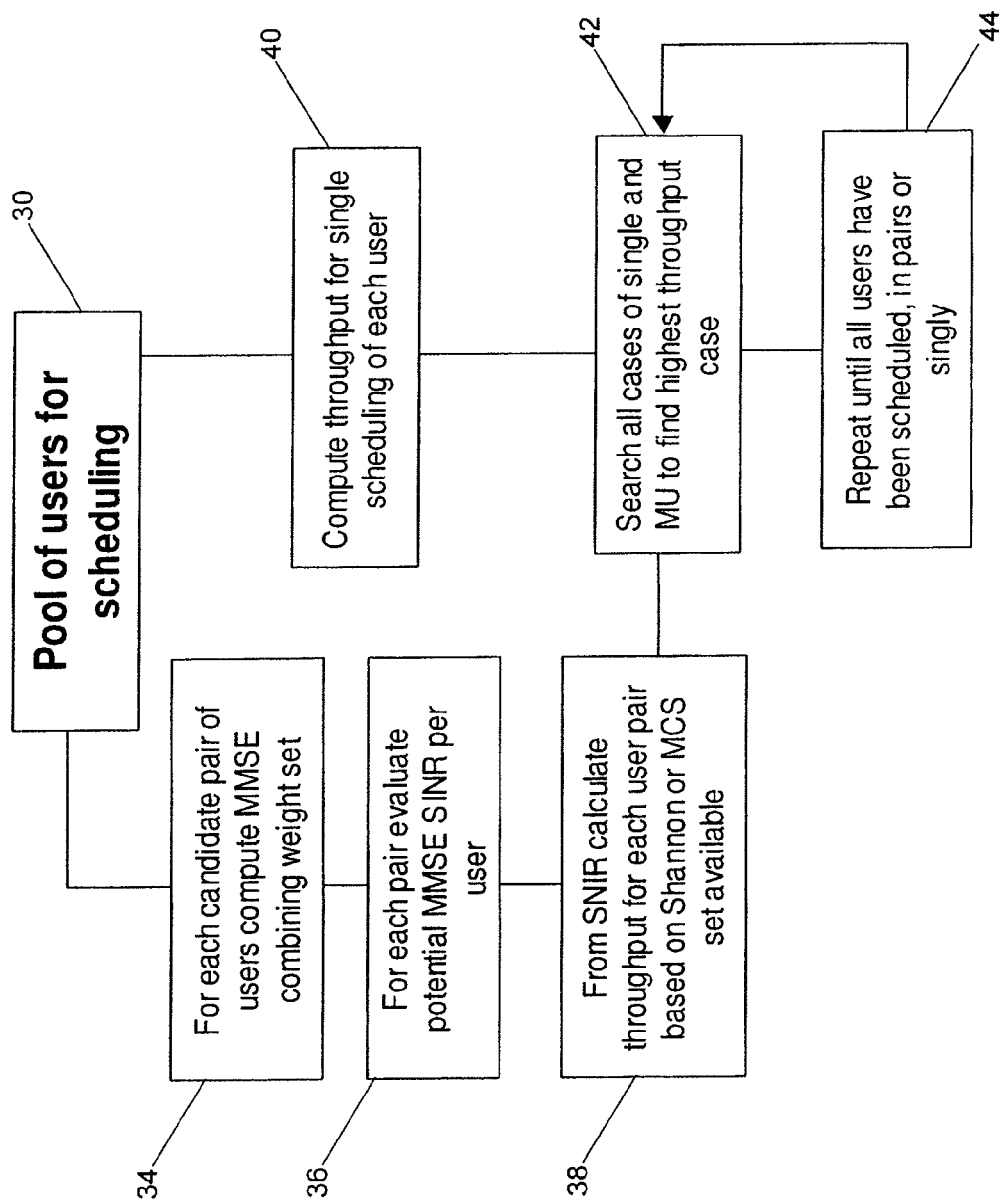

In an alternative embodiment of the present invention the uplink scheduler may determine whether to co-schedule UEs using the method illustrated in FIG. 5. As discussed with reference to FIG. 2 the channel is determined (not shown) and a pool of UEs which transmit data over the channel is also determined, step 30.

For each pair of users the minimum mean square error (MMSE) of the UEs' transmissions is computed by combining the weight set as illustrated in step 34. Using the MMSE weight sets the potential SINR for each user may be calculated as determined in step 36. The throughput of the combined transmissions of the two UEs can then be determined as in step 38. The throughput may be calculated using a Shannon or modulation code set (MCS) set or any other suitable method.

At the same time the throughput for each UE alone is also calculated, step 40. This throughput may be calculated using any suitable method.

The throughputs of each individual UE and each pair of UEs are compared and the UE or pair of UEs with the highest throughput are scheduled first, step 42. This UE or pair of UEs are then removed from the pool of UEs which are to be scheduled and the process repeated until all the UEs are scheduled either individually or in combination with another UE, step 44.

Any suitable technique may be used to separate the co-scheduled transmissions of two user equipments, for example, instead of the MMSE, a SIC (successive interference cancellation) approach may be used. Additionally, any alternative criteria other than throughput may be used to determine which UEs are scheduled. For example the equal throughput (EQT) for each user may be calculated and then compared.

Additionally, the uplink scheduler may only co-schedule UEs where the total throughput of the co-scheduled UEs' transmissions is below a threshold. Alternatively, the orthogonality factor for each pair of UEs may be determined and used to determine whether to co-schedule the UEs in the pair or if they should not be co-scheduled.

As before the comparison of UEs and pairs of UEs is continued until all the users have been scheduled.

It is preferable that the time constant of scheduling for the UEs is a shorter time period than the time constant of the change of the channel Small-Scale Fading (SSF). It is therefore preferable that the UEs which are co-scheduled are nomadic or fixed, such that changes due to SSF will be slow, due to the low levels of Doppler spread. The uplink scheduler may be configured to determine whether the UE is mobile, for example a cellular telephone, or nomadic or fixed, such as a laptop.

The co-scheduling may be applied to one or more bands within a transmission channel. Outside of these bands UEs are scheduled in a conventional manner. Any other suitable method for calculating orthogonality may be used.

Any one of the methods may be applied to a network or part of a network having a receiver station and multiple transmitter stations where the receiver station has a greater or equal number of antennas compared to the total number of UE transmit antennas for the UEs that might be co-scheduled on the same time-frequency resource block.

What is claimed is:

1. A method for operating a base station in a wireless network including the base station and a plurality of user equipments, wherein the base station includes a plurality of antennas, wherein each of the user equipments includes one antenna, the method comprising:
   a) for each of the user equipments, determining a steering vector for the user equipment based on a transmission from the user equipment to the base station;
   b) for each of the user equipments, comparing the steering vector for the user equipment with the steering vector for another one of the user equipments, to determine a corresponding orthogonality factor for the steering vectors;
   c) selecting for simultaneous transmission a first pair of the user equipments whose corresponding orthogonality factor is below a first threshold and whose combined throughput is greater than a second threshold, wherein said simultaneous transmission is co-scheduled transmission on a same time-frequency resource block;
   d) separately scheduling a second pair of the user equipments whose corresponding orthogonality factor is greater than the first threshold.

2. The method of claim 1, wherein, for each of the user equipments, said comparing includes computing the corresponding orthogonality factor based on the expression $$\frac{|H_1^H H_2|}{|H_1||H_2|},$$

where $H_1$ is the steering vector for the user equipment, wherein $H_2$ is the steering vector for said another one of the user equipments, wherein superscript H denotes a conjugate transpose operation.

3. The method of claim 1, wherein the first pair of user equipments are selected for simultaneous transmission on a channel where a change of phase and amplitude of tones in the channel is substantially consistent in both the time and frequency dimensions.

4. The method of claim 1, wherein a plurality of pairs of user equipments are successively co-scheduled in order of increasing orthogonality factor wherein the plurality of pairs include the first pair.

5. The method of claim 1, wherein the orthogonality factor is modified by multiplying the orthogonality factor by a scalar value, wherein the scalar value is computed based on a greatest of:
   an SINR associated with the user equipment and
   an SINR associated with said another user equipment.

6. The method of claim 1, wherein the orthogonality factor is modified by multiplying the orthogonality factor by a function of:
   an SINR associated with the user equipment; and
   an SINR associated with said another user equipment.

7. The method of claim 6, wherein the function is $Log_{10}(SINR_{MAX})$, wherein $SINR_{MAX}$ is a maximum of:
   the SINR associated with the user equipment and
   the SINR associated with said another user equipment.

8. The method of claim 6, wherein the function is a ratio of $SINR_{MAX}$ to $SINR_{MIN}$,
   wherein $SINR_{MAX}$ is a maximum of the SINR associated with the user equipment and the SINR associated with said another user equipment,
   wherein $SINR_{MIN}$ is a minimum of the SINR associated with the user equipment and the SINR associated with said another user equipment.

9. An uplink scheduler for a base station in a wireless network including the base station and a plurality of user equipments, the uplink scheduler comprising:
   an input, wherein, for each of the user equipments, the input is configured to receive a steering vector for the user equipment;
   a comparator, wherein, for each of the user equipments, the comparator is configured to compare the steering vector for the user equipment with the steering vector for another one of the user equipments, to determine a corresponding orthogonality factor for the steering vectors; and
   a processor configured to:
      select for simultaneous transmission a first pair of the user equipments whose corresponding orthogonality factor is below a first threshold and whose combined throughput is greater than a second threshold, wherein said simultaneous transmission is co-scheduled transmission on a same time-frequency resource block; and
      separately schedule a second pair of the user equipments whose corresponding orthogonality factor is greater than the first threshold.

10. The uplink scheduler of claim 9, further comprising:
    a channel selector to select a channel where a change of phase and amplitude of tones in the channel is substantially consistent in both time and frequency dimensions, wherein the first pair of user equipments is selected for simultaneous transmission on said selected channel.

11. The uplink scheduler of claim 9, wherein the orthogonality factor is modified by multiplying the orthogonality factor by a scalar value that depends on a greatest of:
    an SINR associated with the user equipment and
    an SINR associated with said another user equipment.

12. A base station for communication with a plurality of user equipments, the base station comprising:
    a receiver, wherein, for each of the user equipments, the receiver is configured to receive a transmission from the user equipment;

an uplink scheduler including a comparator, wherein, for each of the user equipments, the comparator is configured to compare a steering vector of the transmission from the user equipment with a steering vector of the transmission from another one of the user equipments, in order to determine a corresponding orthogonality factor of the steering vectors; and a processor configured to:
 select for simultaneous transmission a first pair of the user equipments whose corresponding orthogonality factor is below a first threshold and whose combined throughput is greater than a second threshold, wherein said simultaneous transmission is co-scheduled transmission on a same time-frequency resource block; and separately schedule a second pair of the user equipments whose corresponding orthogonality factor is greater than the first threshold.

13. A non-transitory, computer useable medium for a base station in a wireless network including the base station and a plurality of user equipments, wherein the medium stores program instructions, wherein the program instructions are executable by a processor to:
 a) for each of the user equipments, receive a steering vector for the user equipment;
 b) for each of the user equipments, compare the steering vector for the user equipment with the steering vector for another one of the user equipments, to determine a corresponding orthogonality factor for the steering vectors;
 c) select for simultaneous transmission a first pair of the user equipments whose corresponding orthogonality factor is below a first threshold and whose combined throughput is greater than a second threshold, wherein said simultaneous transmission is co-scheduled transmission on a same time-frequency resource block; and
 d) separately schedule a second pair of the user equipments whose corresponding orthogonality factor is greater than the first threshold.

* * * * *